(12) United States Patent
Huang et al.

(10) Patent No.: US 7,532,026 B2
(45) Date of Patent: May 12, 2009

(54) TESTING DEVICE

(75) Inventors: Guan-Yu Huang, Taipei (TW);
Chang-Long Pan, Taipei (TW);
Shih-Tung Chan, Taipei (TW); Lei Ye,
Taipei (TW); Michael Yang, Taipei
(TW); Leo Yue, Taipei (TW)

(73) Assignee: Inventec Corporation, Taipei (TW)

( * ) Notice: Subject to any disclaimer, the term of this patent is extended or adjusted under 35 U.S.C. 154(b) by 368 days.

(21) Appl. No.: 11/566,161

(22) Filed: Dec. 1, 2006

(65) Prior Publication Data
US 2007/0296450 A1 Dec. 27, 2007

(30) Foreign Application Priority Data
Jun. 23, 2006 (TW) .............................. 95128262 A

(51) Int. Cl.
*G01R 31/28* (2006.01)
*B65G 15/00* (2006.01)

(52) U.S. Cl. .................................. 324/770; 414/222.01
(58) Field of Classification Search ................ 324/770; 345/102, 204, 207, 600, 690, 904; 358/10, 358/29, 180, 189; 414/222.01; 700/112, 700/228
See application file for complete search history.

(56) References Cited

U.S. PATENT DOCUMENTS

| 7,136,076 | B2 * | 11/2006 | Evanicky et al. ............ 345/600 |
| 7,340,843 | B2 * | 3/2008 | Zhang et al. .................. 33/533 |
| 7,405,742 | B2 * | 7/2008 | Evanicky et al. ............ 345/690 |

* cited by examiner

*Primary Examiner*—Ernest F Karlsen

(57) ABSTRACT

A testing device for performing a white balance test on a display device of an electronic equipment is disclosed. The testing device includes a supporting body, a testing member, a position-adjusting member and a clipping member. The testing member is disposed on the supporting body and used to mask the display device and perform the white balance test on the display device. The testing member has a testing opening. The position-adjusting member is disposed on the supporting body for adjusting a position where the testing member is disposed on the supporting body. The clipping member presses the display device against the testing member when the position-adjusting member makes the testing member aligned with the display device such that the display device can be closely contacted with the testing member. Thus, the white balance test can be performed on the display device through the testing member.

7 Claims, 4 Drawing Sheets

TESTING DEVICE

BACKGROUND OF THE INVENTION

1. Field of the Invention

The present invention relates generally to a testing device, and more particularly to a testing device for performing a white balance test on electronic equipments on a production line.

2. Description of Related Art

In a production line process for fabricating LCD TVs, components needed for fabricating LCD TVs should be prepared first and then respectively assembled in different assembling areas on the production line. Finally, related tests need to be performed on assembled LCD TVs. Specially, to obtain information about quality of a display screen, a white balance test is necessary.

Currently, to perform a white balance test, a LCD TV needs to be taken off the production line and put into a special operation area such as a darkroom so as to block external light. Then, a white balance test can be performed. However, the above method can result in discontinuity of the whole production process. Also, taking products off the production line and putting them back after the test complicate the production process, reduce work efficiency and increase labor cost.

To overcome the above drawbacks, a curtain mask is generally used to mask light so as to facilitate white balance tests on LCD TVs on a production line. However, the curtain mask only partially masks the display screen or masks around the LCD TV. Since the LCD TV is located on the production line through a carrier that can provide the power, the bottom of the LCD TV can't be completely isolated from external light. Thus, problem of light leaking is generated, which accordingly adversely affects the test. To make the curtain mask closely mask the display screen without the happening of light leaking, additional tools are needed, which not only increases the cost, but also bring inconvenience to the operation.

Therefore, there is a need to provide a testing device that can perform white balance tests on LCD TVs on a production line.

SUMMARY OF THE INVENTION

According to the above drawbacks, an objective of the present invention is to provide a testing device allowing a white balance test on a display device to be performed on a production line.

Another objective of the present invention is to provide a testing device having improved light blocking effect.

In order to attain the above and other objectives, a testing device for testing a display device of electronic equipment is proposed. The testing device comprises: a supporting body; a testing member disposed on the supporting body for masking the display device such that a white balance test can be performed on the display device, wherein the testing member has a testing opening; a position-adjusting member disposed on the supporting body for adjusting the position of the testing member relative to the display device; and a clipping member, which is used to press the display device against the testing member when the position-adjusting member makes the testing member aligned with the display device such that the display device can be closely contacted with the testing member, thereby performing a white balance test on the display device through the testing member.

The testing device can further comprise a rotating member and a fixing member for adjusting the slanting angle of the testing member relative to the display device. The rotating member comprises a rotating portion that can rotate and keep rotating angle of the testing member, and the fixing member comprises a fixing portion for adjusting interval between the testing member and the supporting body so as to fix rotating angle of the testing member.

The testing member has a buffer portion serving as a seal between the testing member and the display device.

The position-adjusting member further comprises a first position-adjusting portion for adjusting the front and rear position of the testing member, a second position-adjusting portion for adjusting left and right position of the testing member, and a third position-adjusting portion for adjusting upper and lower position of the testing member.

The clipping member further comprises a clipping portion for clipping and fixing the display device and the testing member, an operating portion for rotating the clipping portion and moving the clipping portion in a certain direction, and a propelling portion combined with a resilient member. When the operating portion is moved in a certain direction, the clipping portion is propelled to move by the propelling portion until the clipping portion reaches a position where the display device is disposed between the clipping portion and the testing member. Then the clipping portion is pressed against the display device by the resilient force of the resilient member. As a result, the display device and the testing member are closely contacted with each other.

According to the testing device of the present invention, by adjusting position of the testing member relative to a display device through a position-adjusting member and slightly adjusting slanting position of the testing member through a rotating member and a fixing member, the testing member can be aligned with the display device. Further by making the clipping portion of the clipping member press against the display device, the display device is closely contacted with the testing member so as to block external light. Thus, a white balance test can be directly performed on the display device on the production line without the need of taking the display device off the production line as in the conventional art, thereby ensuring a continuous production process. Compare with the prior art, work efficiency is improved and operation process is simplified.

Further, the testing device of the present invention has a simple structure and has a low fabrication and maintenance cost. In addition, through the buffer portion of the testing member and the clipping portion that closely fixes the testing member and the display device, the conventional problem of light leaking is prevented.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be made without departing from the spirit of the present invention.

Figure 1:
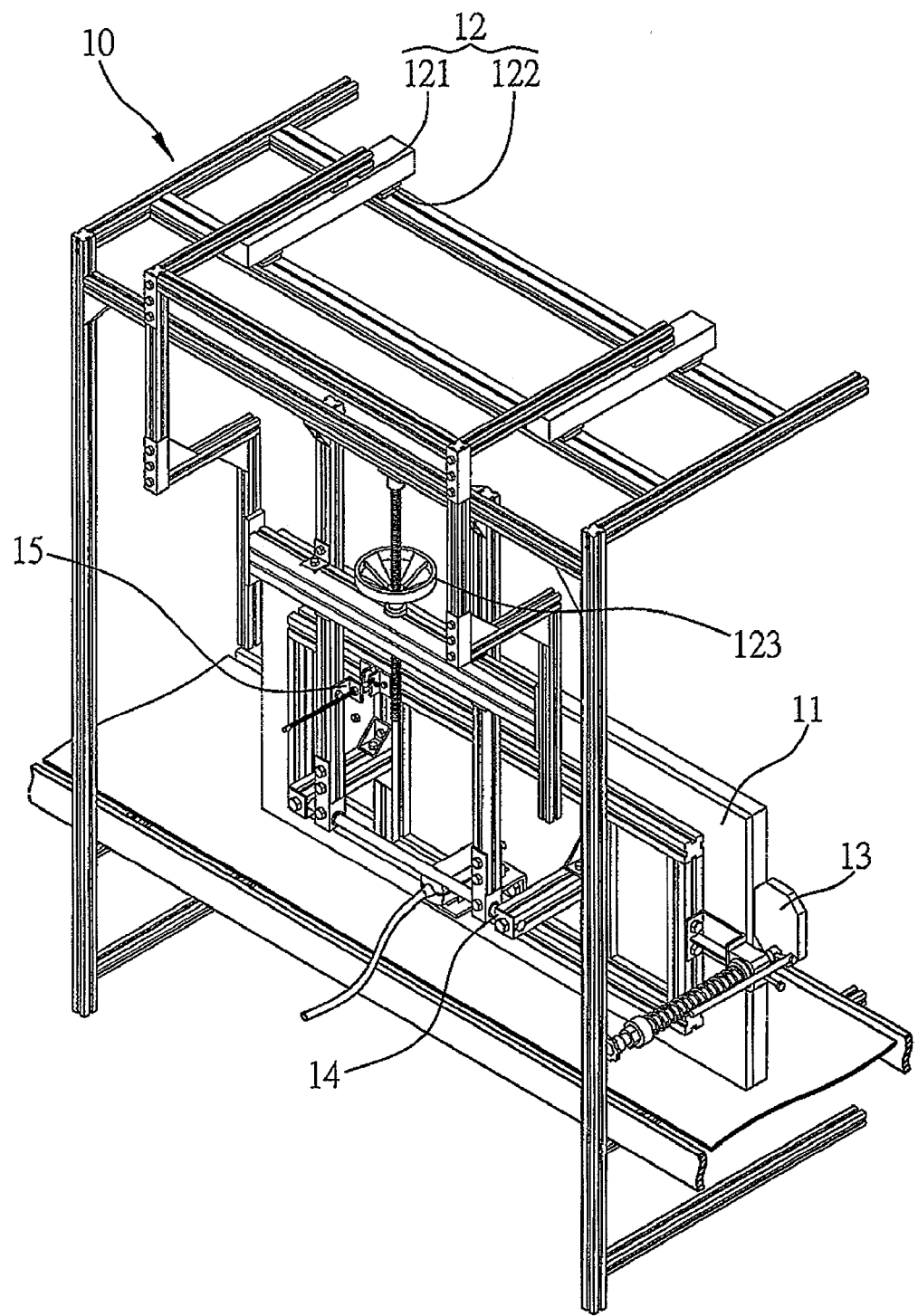
FIG. 1 is a structural diagram of a testing device according to the present invention.
Figure 2A:
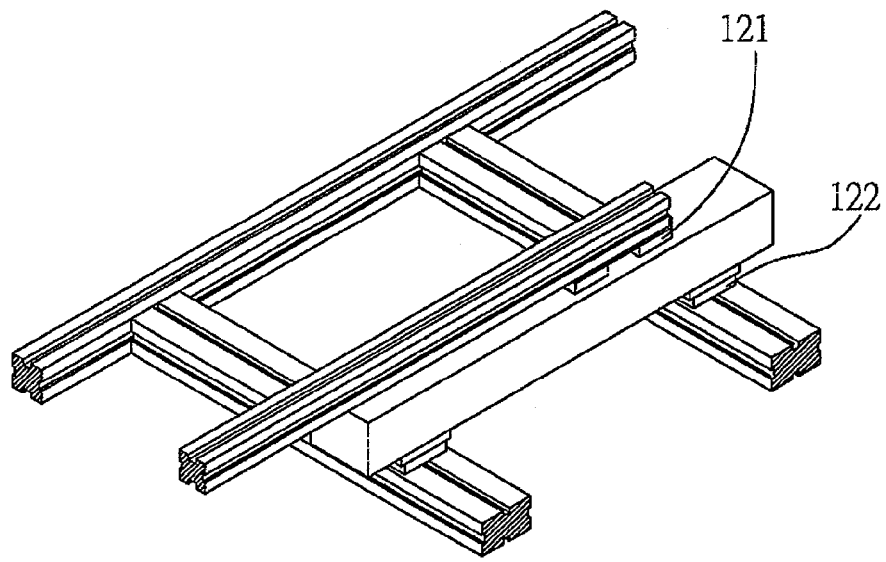
FIGS. 2A and 2B are structural diagrams of a position-adjusting member according to the present invention.
Figure 2B:
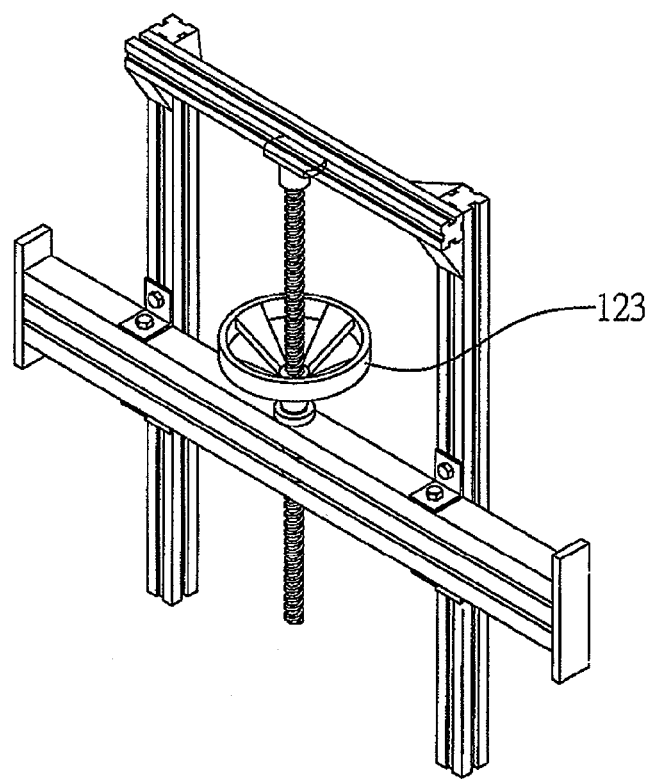
Figure 3:
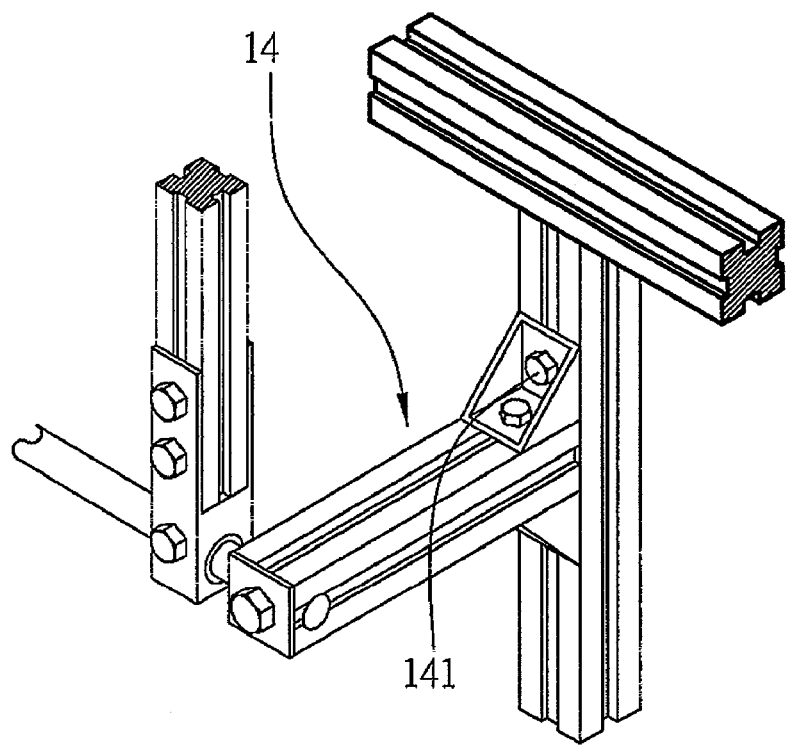
FIG. 3 is a structural diagram of a rotating member according to the present invention.
Figure 4:
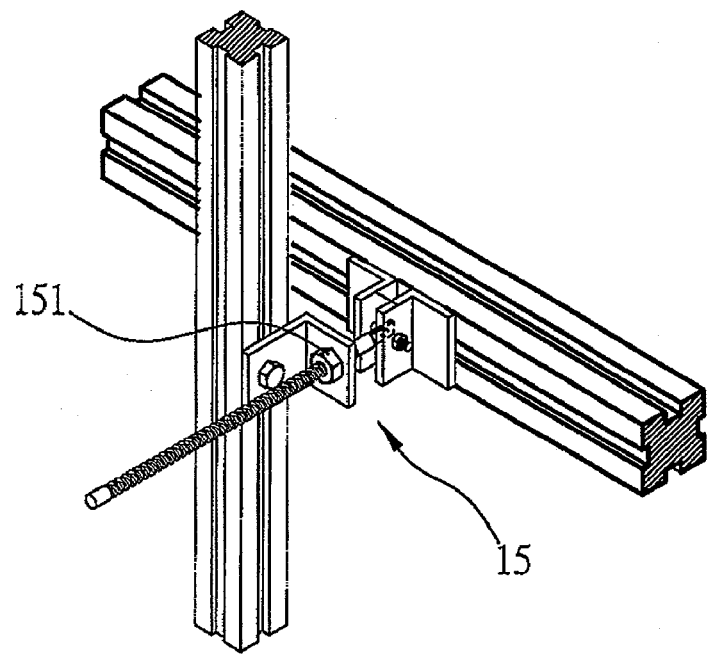
FIG. 4 is a structural diagram of a fixing member according to the present invention.
Figure 5:
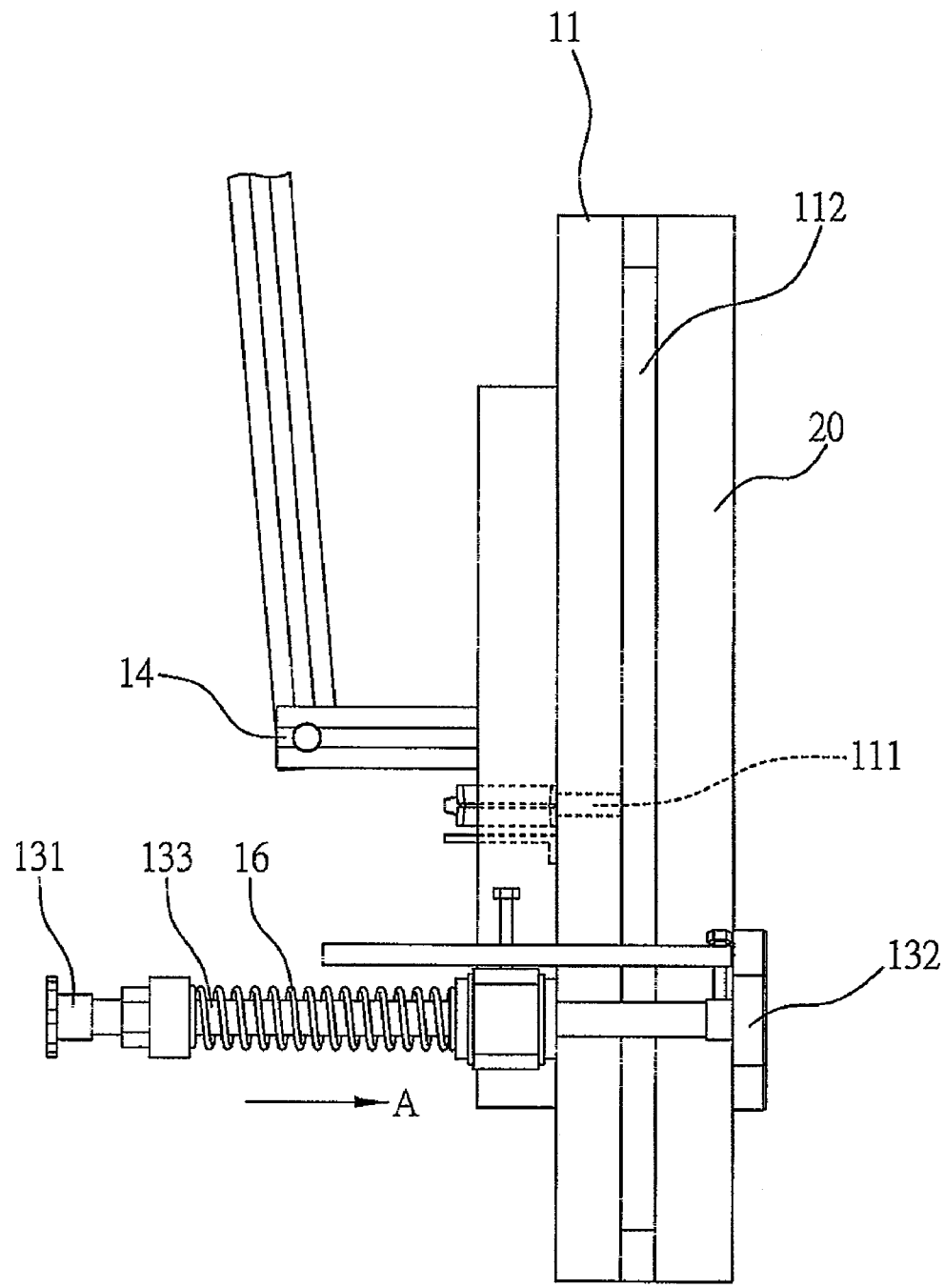
FIG. 5 is a structural diagram of the testing device with a display device fixed thereto according to the present invention.

FIGS. 1 to 4 respectively show a testing device, a position-adjusting member, a rotating member and a fixing member according to the present invention. As shown in FIG. 1, the testing device of the present invention comprises a supporting body 10, a testing member 11, a position-adjusting member 12, a clipping member 13, a rotating member 14 and a fixing member 15. The testing device is used to fix a display device 20 of an electronic equipment, as shown in FIG. 5, so as to perform a white balance test on the display device 20.

The supporting body 10 of the present invention can be disposed on a production line of electronic equipments, and allow stack boards carrying display devices on the production line to be passed therebetween.

The testing member 11 is disposed on the supporting body 10 for masking the display device 20. The testing member 11 has a testing opening 111 through which a white balance test can be performed on the display device 20. The testing member 11 further comprises a buffer portion 112 to be disposed between the testing member 11 and the display device and server as a seal between the testing member 11 and the display device 20. Thus, the display device 20 can be protected from interference of external light. The buffer portion 112 is made of a buffer material such as sponge or foam plastic.

The position-adjusting member 12 is disposed on the supporting body 10 for adjusting position of the testing member 11 relative to the display device 20. The position-adjusting member 12 comprises a first position-adjusting portion 121 having a sliding track structure for adjusting front and rear position of the testing member 11; a second position-adjusting portion 122 having a sliding track structure for adjusting left and right position of the testing member 11; and a third position-adjusting member 123 having an up and down helix structure for adjusting upper and lower position of the testing member 11.

The clipping member 13 is used to make the display device 20 and the testing member 11 be closely contacted with each other. The clipping member 13 comprises a clipping portion 132 for clipping and fixing the display device and the testing member 11; an operating portion 131 for rotating the clipping portion 131 and moving the clipping portion 132 in a certain direction; and a propelling portion 133 combined with a resilient member 16, wherein when the operating portion 131 is moved in a certain direction A as shown in FIG. 5, the clipping portion 132 is propelled to move by the propelling portion 133 until the clipping portion 132 reaches a position where the display device 20 is located between the clipping portion 132 and the testing member 11. Thereafter, the clipping portion 132 is pressed against the display device 20 by the resilient force of the resilient member 16, thereby clipping and fixing the display device 20 and the testing member 11.

The rotating member 14 and the fixing member 15 are used to adjust the slanting position of the testing member 11 relative to the display device 20. The rotating member 14 has a rotating axis structure that allows the testing member 11 to rotate at any angle. The rotating member 14 comprises a rotating portion 141 such as a rotating screw cap for keeping rotating angle of the testing member 11. The fixing member 15 can have a screw bolt structure, which comprises a fixing portion 151 for adjusting interval between the testing member 11 and the supporting body 10 so as to fix the rotating angle of the testing member 11.

FIG. 5 shows a structural diagram of the testing device with the display device fixed thereto. As shown in FIG. 5, to perform a white balance test on the display device 20 of electronic equipment, the testing member 11 should be aligned with the display device 20. In this aligning process, position of the testing member 11 can be adjusted through the position-adjusting member 12. Further, the slanting position of the testing member 11 can be slightly adjusted through the rotating member 14 and the fixing member 15. After the testing member 11 is aligned with the display device 20, the operating portion 131 of the clipping member 13 is pushed such that the clipping portion 132 can be propelled to move by the propelling portion 133. When the clipping portion 132 reaches a position where the display device 20 is disposed between the clipping portion 132 and the testing member 11, the clipping portion 132 is pressed against the display device 20 by the resilient force of the resilient member 16. Accordingly, the display device 20 and the testing member 11 are closely contacted with each other. As a result, external light can be blocked and a white balance test can be performed on the display device 20.

Therefore, according to the testing device of the present invention, by adjusting position of the testing member relative to a display device through a position-adjusting member and slightly adjusting slanting position of the testing member through a rotating member and a fixing member, the testing member can be aligned with the display device. Further by making the clipping portion of the clipping member press against the display device, the display device is closely contacted with the testing member so as to block external light. Thus, a white balance test can be directly performed on the display device on the production line without the need of taking the display device off the production line as in the conventional art, thereby ensuring a continuous production process. Accordingly, work efficiency is improved and operation process is simplified.

Further, the testing device of the present invention has a simple structure and has a low fabrication and maintenance cost. In addition, through the buffer portion of the testing member and the clipping portion that closely fixes the testing member and the display device, the conventional problem of light leaking is prevented.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A testing device for performing a white balance test on a display device of an electronic equipment, the testing device comprising:
    a supporting body;
    a testing member disposed on the supporting body, for masking the display device and performing the white balance test on the display device, the testing member having a testing opening;
    a position-adjusting member disposed on the supporting body for adjusting a position where the testing member is disposed on the supporting body; and a clipping member, which is used for pressing the display device against the testing member when the position-adjusting member makes the testing member aligned with the display device such that the display device can be closely contacted with the testing member, thereby performing the white balance test on the display device through the testing member.

2. The testing device of claim 1, wherein the clipping member comprises:

a clipping portion for clipping and fixing the display device and the testing member;

an operating portion for rotating the clipping portion and moving the clipping portion in a certain direction; and a propelling portion combined with a resilient member, wherein, when the operating portion is moved in a certain direction, the clipping portion is propelled to move by the propelling portion until the clipping portion reaches a position where the display device is disposed between the clipping portion and the testing member, thereafter, by the resilient force of the resilient member, the clipping portion is pressed against the display device, thus, the display device and the testing member are closely contacted with each other.

3. The testing device of claim 1, further comprising a rotating member and a fixing member for adjusting the slanting angle of the testing member relative to the display device.

4. The testing device of claim 3, wherein the rotating member comprises a rotating portion for rotating the testing member and keeping a rotating angle of the testing member.

5. The testing device of claim 3, wherein the fixing member comprises a fixing portion for adjusting an interval between the testing member and the supporting body so as to fix a rotating angle of the testing member.

6. The testing device of claim 1, wherein the testing member has a buffer portion serving as a seal between the testing member and the display device.

7. The testing device of claim 1, wherein the position-adjusting member comprises:

a first position-adjusting portion for adjusting the front and rear position of the testing member;

a second position-adjusting portion for adjusting left and right position of the testing member; and a third position-adjusting portion for adjusting upper and lower position of the testing member.

* * * * *